United States Patent [19]
Haack et al.

[11] Patent Number: 5,918,644
[45] Date of Patent: *Jul. 6, 1999

[54] AIR DUCT AND METHOD OF MAKING SAME

[76] Inventors: C. William Haack, 2980 Casco Point Rd., Orono; Michael T. Nixon, 2810 Urbandale Ln., Plymouth, both of Minn. 55447

[ * ] Notice: This patent issued on a continued prosecution application filed under 37 CFR 1.53(d), and is subject to the twenty year patent term provisions of 35 U.S.C. 154(a)(2).

[21] Appl. No.: 08/652,894

[22] Filed: May 23, 1996

[51] Int. Cl.⁶ ...................................................... F16L 9/14
[52] U.S. Cl. ................. 138/151; 52/309.9; 52/309.14; 138/149; 138/146; 138/155; 138/158
[58] Field of Search ..................... 138/149, 151, 138/155, 158, 146, DIG. 4; 52/309.9, 309.14

[56] References Cited

U.S. PATENT DOCUMENTS

| | | | |
|---|---|---|---|
| 3,251,382 | 5/1966 | Tatsch | 138/151 |
| 4,022,248 | 5/1977 | Hepner et al. | 138/151 X |
| 5,310,594 | 5/1994 | Holland et al. | 138/151 X |
| 5,527,598 | 6/1996 | Campbell et al. | 428/251 |
| 5,549,942 | 8/1996 | Watts | 138/DIG. 4 X |

OTHER PUBLICATIONS

Amcraft, Inc., literature re Fiberglass Duct Fabrication.

NAIMA literature re Technical Library of Fibrous Glass Insulated Air Ducts.

*Primary Examiner*—William Stryjewski
*Attorney, Agent, or Firm*—Merchant, Gould, Smith, Edell, Welter & Schmidt, P.A.

[57] ABSTRACT

An air conveying duct has a foam core sealed on the inside and reinforced on the outside. The duct absorbs noise and neither introduces impurities into the air nor collects impurities from the air.

16 Claims, 3 Drawing Sheets

AIR DUCT AND METHOD OF MAKING SAME

FIELD OF THE INVENTION

The present invention relates to acoustical, fiber-free air ducts and methods of making same.

BACKGROUND OF THE INVENTION

Air circulation systems are incorporated into most building structures. Such air circulation systems typically include air ducts which extend from a central source to regions throughout the building. The central source may include means for heating, ventilating, and/or cooling the air. The air itself is usually forced or blown throughout the system by means of fans or blowers, respectively.

Historically, air ducts have been made of sheet metal. However, those skilled in the art will recognize that sheet metal air ducts contribute to the distribution of unacceptably loud noise. In particular, metal air ducts tend to transmit sound with little or no attenuation, thereby placing an entire building in communication with noise made by the heating, ventilating, and/or cooling equipment, as well as noise made by other operations taking place within the building. A major impact of mechanical noise through duct work is noise that interferes with verbal communications resulting in diminished speech intelligibility in spaces in which verbal communications is a function of the activities within the space. The resulting "noise pollution" can reduce productivity and may, in extreme cases, lead to hearing damage.

One prior art "solution" to the noise problems associated with air ducts has been to line or replace the metal air ducts with fiberglass panels. Those skilled in the art will recognize that fiberglass is suitable for both thermal and acoustical insulation. However, those skilled in the art will also recognize that fiberglass is coming under ever greater scrutiny, being perceived by many as a potential health hazard. The primary concern centers around the fibrous nature of fiberglass relative to the established hazards associated with asbestos fibers.

Although suitable substitutes to fiberglass are being introduced for thermal insulation purposes, the same cannot be said for noise attenuation applications. Thus, a need exists for an air duct and/or an air duct liner which attenuates noise without introducing known health hazards into a building's environment. Ideally, any such air duct and/or air duct liner should comply with current building code requirements and be compatible with current construction methods.

SUMMARY OF THE INVENTION

The present invention provides air ducts and air duct liners which are acoustical and fiber free, as well as methods of making same. In a preferred embodiment, a reinforcing material is disposed on one side of a foam sheet, and a coating material is disposed on an opposite side of the foam sheet. The foam sheet is folded into an air duct configuration with the reinforcing material on the outside and the coating material on the inside.

BRIEF DESCRIPTION OF THE DRAWINGS

With reference to the Figures of the Drawing, wherein like numerals represent like parts and assemblies throughout the several views.

DETAILED DESCRIPTION OF THE PREFERRED EMBODIMENT

Figure 1:
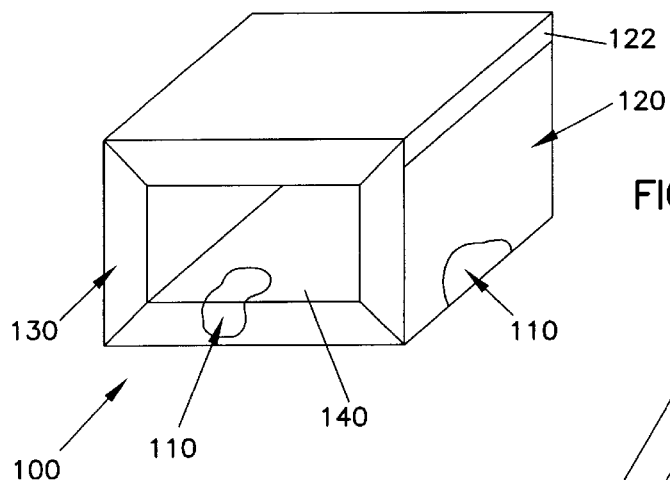
FIG. 1 is an isometric view of a four-sided air duct constructed according to the principles of the present invention.

A preferred embodiment air duct constructed according to the principles of the present invention is designated as 100 in FIG. 1. The air duct 100 has four sides or walls which cooperate to define a rectangular configuration. Each of the walls includes an intermediate layer of foam 110, an outer layer of reinforcing material 120, and an inner layer of coating material 130. The air duct 100 is secured in its rectangular configuration by means of an overlapping portion 122 of the reinforcing material 120 and adhesive tape (not shown).

The foam 110 may be described as non-fibrous, contrary to fiberglass and asbestos. The foam 110 may also be described as acoustical, meaning it has an NRC rating of @ 0.80. In the preferred embodiment 100, the foam 110 is an open cell, melamine formaldehyde polymer with a melamine resin base and a density of about 0.7 pounds per cubic inch. The foam 110 is manufactured by BASF in Germany, and is marketed worldwide under the trademark WILLTEC by Illbruck, Inc. of Minneapolis, Minn. (the assignee of the present invention). This particular foam 110 is considered superior to polyurethane foams because of its Class 1 rating, and it is considered superior to phenolic foams because of its resistance to crumbling.

The reinforcing material 120 may be described as a facing material. The material 120 is flexible, yet strong, and functions as the outer shell of the air duct 100. In this regard, the material 120 effectively seals the foam 110 from its external environment and contributes to the rigidity of the air duct 100. The material 120 may be selected from among a group of suitable materials, including (but not limited to) a foil scrimmed KRAFT paper (FSK) and a foil scrimmed vinyl (FSV) KRAFT paper comprises a strong paper or cardboard made from sulfate-process wood pulp.

The inner coating 130 may be described as a film or sealant which separates the foam 110 from the internal conduit extending through the air duct 100. The coating 130 protects the foam 110 against erosion and airborne contaminants, but does not significantly obstruct or prevent absorption of noise by the foam 110. The coating 130 may be selected from among a group of suitable materials, including polymeric materials such as (but not limited to) HYPALON, TEDLAR, and TYVEC all of which are sold by DuPont. These materials are known to function in a manner which may be described as accoustically transparent.

Figure 5:
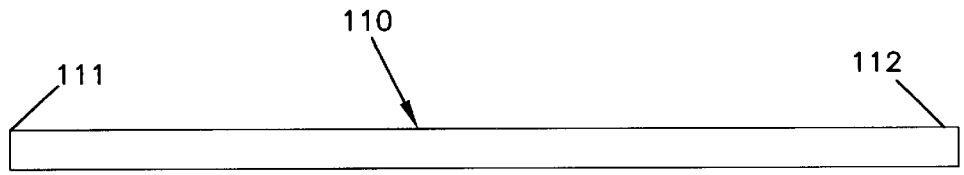
FIG. 5 is an end view of a sheet of foam which is part of the air duct of FIG. 1.

A preferred method of making the air duct 100 is described with reference to FIGS. 5–8. The first step is to obtain a sheet of foam 110, as shown in FIG. 5. The width of the foam sheet 110 is defined between a first side 111 and a second, opposite side 112. The foam sheet 110 extends lengthwise in a direction perpendicular to the end of the sheet shown in FIG. 5. The thickness of the foam sheet 110, as measured perpendicular to the width and the length, is generally a function of design parameters.

Figure 6:
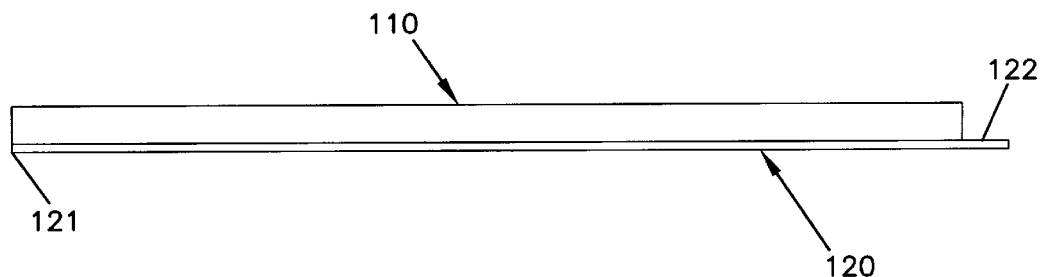
FIG. 6 is an end view of the sheet of foam of FIG. 5, with an outer layer of material connected thereto.

The second step is to secure the facing or outer layer of material 120 to the foam sheet 110. A non-flammable, water-based adhesive provides a suitable connecting means for such purpose. The material 120 is the same length as the foam sheet 110 but slightly wider, as measured between a first side 121 and a second, opposite side 122. The thickness of the material 120 is exaggerated in the Figures for ease of reference. The resulting combination is shown in FIG. 6.

Figure 7:
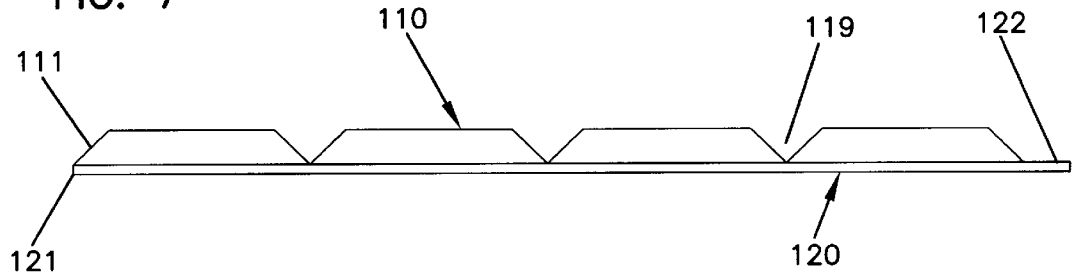
FIG. 7 is an end view of the combination of FIG. 6, with notches cut into the sheet of foam.

The third step in the preferred method of manufacture is to cut or otherwise form notches 119 in the foam sheet 110. The notches 119 are cut in the surface opposite the material 120 and extend through the foam 110 to vertices or corners proximate the material 120. The number of notches 119 and the magnitude of their angles or miter cuts are a function of the number of sides of the air duct. In the preferred embodiment 100, the notches 119 include three "full notches" (or interior notches) and two "half notches" (or end notches) which are formed by cutting into the foam sheet 110 at 45 degree angles. The resulting configuration is shown in FIG. 7.

Figure 8:
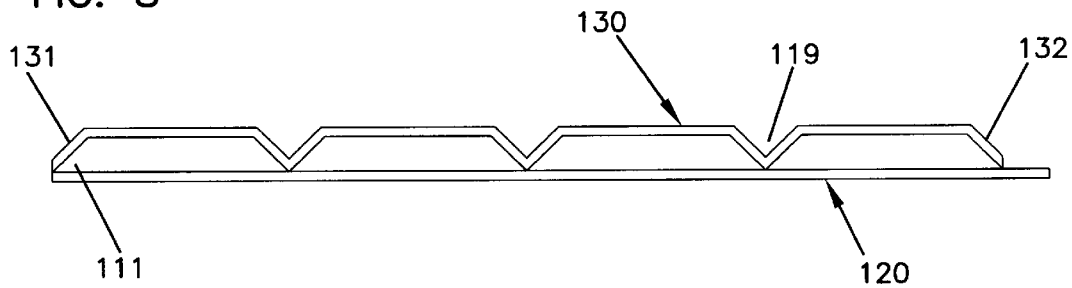
FIG. 8 is a sectioned end view of the combination of FIG. 7, with an inner layer of material connected thereto.

The fourth step is to coat all exposed portions of the foam sheet 110 with the material 130. The coating material 130 is sprayed or otherwise deposited onto the foam 110, including the ends thereof. The coating material 130 extends from a first side 131 to a second, opposite side 132. The thickness of the coating material 130 is also exaggerated for ease of reference. A sectioned view of the resulting product is shown in FIG. 8. The resulting sheet product may be formed into its final configuration either prior to shipping or at the job site.

Figure 2:
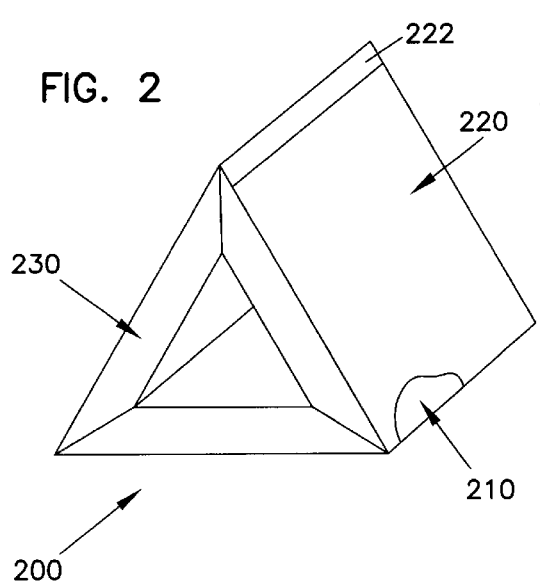
FIG. 2 is an isometric view of a three-sided air duct constructed according to the principles of the present invention.

A three-sided air duct 200 is shown in FIG. 2. The triangular air duct 200 includes an intermediate layer of foam 210, an outer layer of facing material 220 connected to an outer side of the foam 210, and an inner layer of coating material 230 connected to an inner side and the ends of the foam 210. In this embodiment 200, only two interior notches are cut into the foam 210. An overextending flap 222 of facing material 220 helps secure the air duct 200 in its intended configuration.

Figure 3:
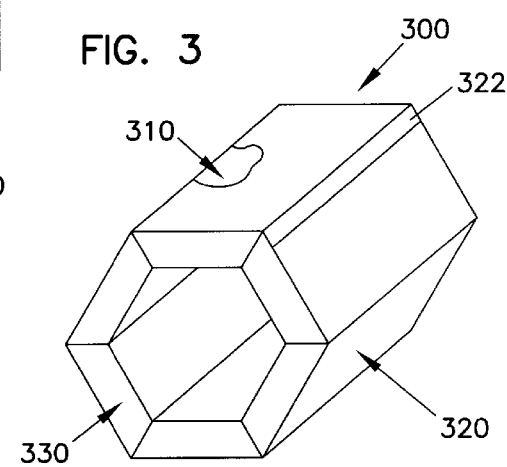
FIG. 3 is an isometric view of a six-sided air duct constructed according to the principles of the present invention.

A six-sided air duct 300 is shown in FIG. 3. The hexagonal air duct 300 includes an intermediate layer of foam 310, an outer layer of facing material 320 connected to an outer side of the foam 310, and an inner layer of coating material 330 connected to an inner side and the ends of the foam 310. In this embodiment 300, five interior notches are cut into the foam 310. An overextending flap 322 of facing material 320 helps secure the air duct 300 in its intended configuration.

Figure 4:
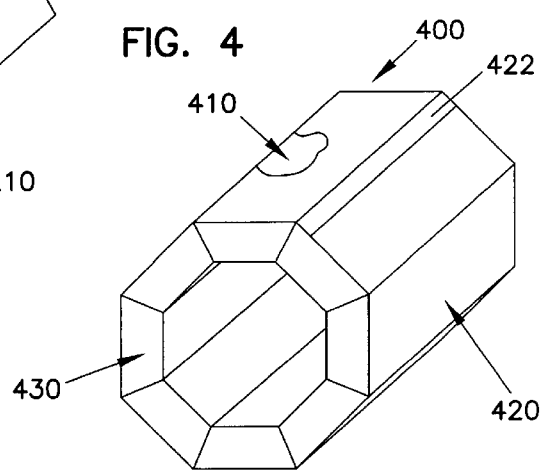
FIG. 4 is an isometric view of a eight-sided air duct constructed according to the principles of the present invention.

An eight-sided air duct 400 is shown in FIG. 4. The octagonal air duct 400 includes an intermediate layer of foam 410, an outer layer of facing material 420 connected to an outer side of the foam 410, and an inner layer of coating material 430 connected to an inner side and the ends of the foam 410. In this embodiment 400, seven interior notches are cut into the foam 410. An overextending flap 422 of facing material 420 helps secure the air duct 400 in its intended configuration.

Figure 9:
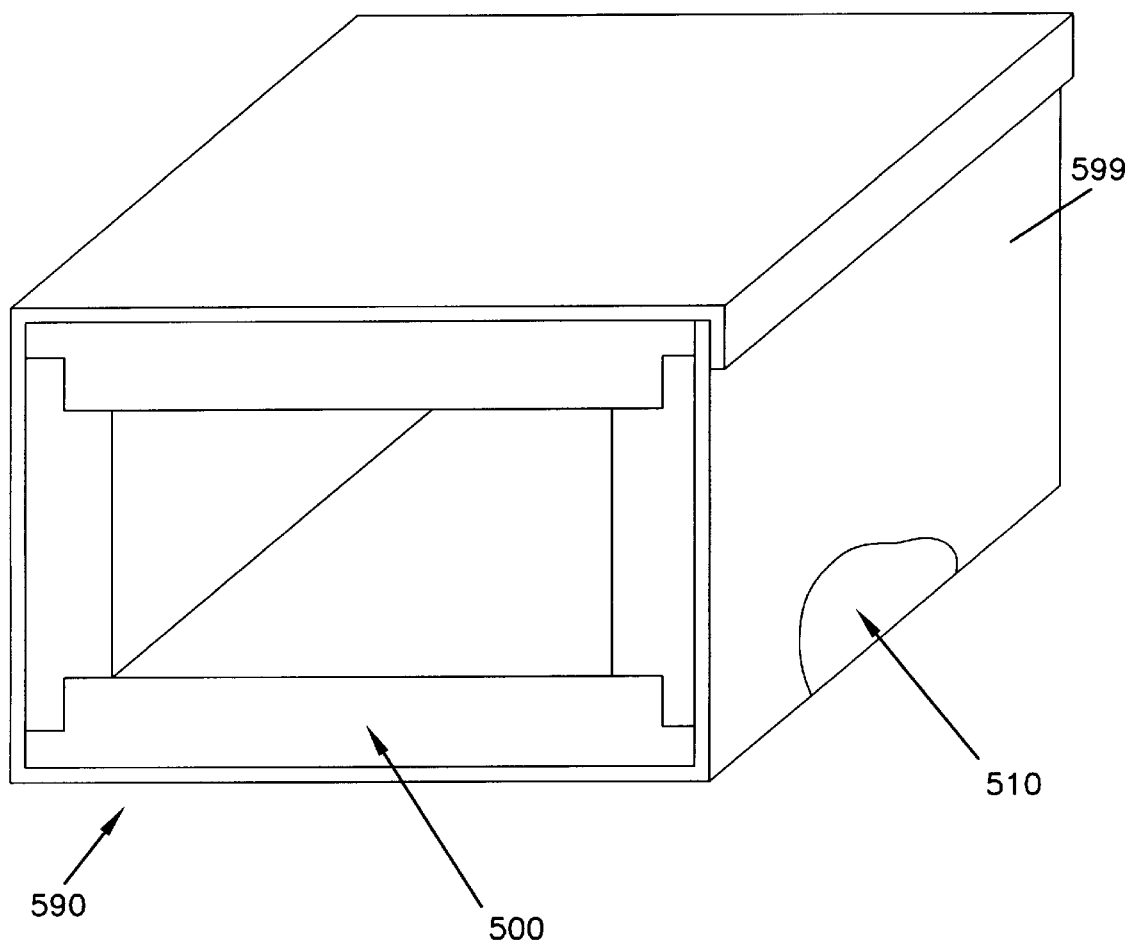
FIG. 9 is a perspective view of a pre-existing metal air duct retrofitted with a foam liner in accordance with according to the principles of the present invention.

Yet another embodiment of the present invention is designated as 590 in FIG. 9. This improved air duct 590 includes a conventional sheet metal air duct 599 into which a foam air duct liner 500 has been inserted. The liner 500 is made of the same melamine foam 510 as the other embodiments but lacks the outer and inner layers.

The present invention has been described with reference to specific embodiments and applications. However, the scope of the present invention is limited only to the extent of the claims which follow.

What is claimed is:

1. An air conveying duct comprising a wall which is formed into a closed profile extending from a first end to a second end in order to convey air therethrough, the wall having an intermediate layer of noise attenuating foam with inner and outer surfaces, an outer layer of material disposed on the outer surface of and reinforcing the foam, and an inner layer of material secured to the inner surface of the foam and sealing off the foam from the air but allowing noise to be absorbed by the foam, wherein the material of the inner layer and the material of the outer layer are dissimilar, and the outer layer of material includes an overlapping portion.

2. The air conveying duct of claim 1, wherein the intermediate layer of noise attenuating foam is a melamine formaldehyde polymer with a melamine resin base.

3. The air conveying duct of claim 1, wherein the outer layer of material comprises a reinforced material, where the reinforced material is a foil scrimmed paper or a foil scrimmed vinyl.

4. The air conveying duct of claim 1, wherein the inner layer of material is a coating of a polymeric material.

5. The air conveying duct of claim 4, wherein the outer layer of material comprises a reinforced material, where the reinforced material is a foil scrimmed paper or a foil scrimmed vinyl.

6. The air conveying duct of claim 5, wherein the intermediate layer of noise attenuating foam is a melamine formaldehyde polymer with a melamine resin base.

7. The air conveying duct of claim 1, wherein the inner layer continues across the first end and the second end of the wall.

8. A method of making an air conveying duct from a sheet of foam, comprising the steps of:

securing a reinforcing layer to a first side of the sheet of foam;

providing notches in the sheet of foam in such a manner that the notches extend inward from a second, opposite side of the sheet of foam;

securing an accoustically transparent sealant to the second side of the sheet of foam; and folding the sheet of foam along each of the notches in such a manner that the second side is inwardly directed and the first side is outwardly directed.

9. The method of claim 8, wherein the notching step is performed after the first securing step and before the second securing step.

10. The method of claim 8, wherein the first securing step involves adhering a reinforced foil to the first side of the foam sheet.

11. The method of claim 8, wherein the second securing step involves coating the second side of the foam sheet with a polymeric material.

12. The method of claim 8, further comprising the steps of measuring an existing air conveying duct made of sheet metal; and sizing and configuring the air conveying duct of claim 11 to fit snugly within the existing air conveying duct.

13. The method of claim 8, further comprising the step of making the sheet of foam with a melamine resin base.

14. A foldable sheet for forming an air conveying duct comprising:

an intermediate layer made of foam said foam including first and second ends, inner and outer surfaces, and a plurality of spaced notches formed in the inner surface and extending between the first and second ends to form a plurality of segments;

a layer of reinforcing material, disposed on the outer surface of the foam, for reinforcing the foam;

a layer of sealing material, secured to the inner surface of the foam, for sealing the foam in a manner that effectively seals off the foam from air but allows noise to pass through, said sealing material being disposed within said plurality of spaced notches, and being disposed over the first and second ends; and the sealing material and the reinforcing material are dissimilar.

15. The foldable sheet of claim 14, wherein the layer of reinforcing material is a sheet of foil.

16. The foldable sheet of claim 14, wherein the layer of sealing material is a coating of polymeric material.

* * * * *